United States Patent [19]
Nemeth

[11] Patent Number: 5,826,206
[45] Date of Patent: Oct. 20, 1998

[54] DEBRIEFING SYSTEMS AND METHODS FOR RETRIEVING AND PRESENTING MULTIPLE DATASTREAMS WITH TIME INDICATION MARKS IN TIME SYNCHRONISM

[75] Inventor: Louis G. Nemeth, Lake Wylie, S.C.

[73] Assignee: Training Inovations Group, LLC, Charlotte, N.C.

[21] Appl. No.: 614,337

[22] Filed: Mar. 12, 1996

[51] Int. Cl.[6] .......................... G09B 19/16; G11B 15/00
[52] U.S. Cl. .................. 701/35; 701/3; 701/14; 360/72.2; 360/27; 386/69; 386/70
[58] Field of Search ............... 364/424.04, 424.012, 364/424.06, 578; 360/5, 27, 72.2; 386/69, 70, 71, 83; 701/35, 3, 14

[56] References Cited

U.S. PATENT DOCUMENTS

| | | | |
|---|---|---|---|
| 3,278,680 | 10/1966 | Hummel | 178/6.8 |
| 3,484,549 | 12/1969 | Ricketts et al. | 178/6 |
| 3,557,304 | 1/1971 | Rue et al. | 178/6.8 |
| 4,207,688 | 6/1980 | Derderian et al. | 35/12 N |
| 4,360,345 | 11/1982 | Hon | 434/262 |
| 4,636,858 | 1/1987 | Hague et al. | 348/463 |
| 4,660,145 | 4/1987 | Hansen | 364/424.06 |
| 4,802,018 | 1/1989 | Tanikawa et al. | 360/13 |
| 5,075,881 | 12/1991 | Blomberg et al. | 364/578 |
| 5,228,854 | 7/1993 | Eldridge | 434/11 |
| 5,240,416 | 8/1993 | Bennington | 434/30 |
| 5,249,967 | 10/1993 | O'Leary et al. | 434/247 |
| 5,283,643 | 2/1994 | Fujimoto | 348/143 |
| 5,333,091 | 7/1994 | Iggulden et al. | 386/55 |
| 5,359,472 | 10/1994 | Motohashi | 360/72.2 |
| 5,366,676 | 11/1994 | Copperman et al. | 434/69 |
| 5,376,007 | 12/1994 | Zirm | 434/262 |
| 5,421,728 | 6/1995 | Milden | 434/5 |
| 5,428,530 | 6/1995 | Brown et al. | 364/578 |
| 5,428,774 | 6/1995 | Takahashi et al. | 364/282.1 |
| 5,457,460 | 10/1995 | Tran et al. | 342/13 |
| 5,467,274 | 11/1995 | Vax | 364/424.06 |
| 5,566,032 | 10/1996 | Cleveland et al. | 360/72.2 |
| 5,613,032 | 3/1997 | Cruz et al. | 386/69 |
| 5,655,058 | 8/1997 | Balasubramanian et al. | 395/2.65 |
| 5,659,400 | 8/1997 | Edakubo et al. | 386/46 |
| 5,675,511 | 10/1997 | Prasad et al. | 348/7 |

FOREIGN PATENT DOCUMENTS

| | | |
|---|---|---|
| 0 675 420 A1 | 10/1995 | European Pat. Off. . |
| WO 95 25313 A | 9/1995 | WIPO . |

OTHER PUBLICATIONS

L. Brokaw; *That Championship Start–up; Inc.* pp. 58–65; Jan. 1996.

Advisory Circular; *Crew Resource Management Training: U.S. Dept. of Transp. Fed. Aviation Adm.*; Jan. 3, 1995.

Captain Marshall Rogers; *CADS Computer Aided Debriefing Station; The CRM Advocate;* Issue 93.1; p. 2 (Oct. 1993).

Captain Lou Nemeth; *Digital Debriefing Systems for CRM; The CRM Advocate;* Issue 94.1; p. 7 (Jan. 1994).

International Search Report mailed Jul. 16, 1997 for PCT/US 97/03560.

Houck, M.R. et al., "A Cognitive Classification of Pilot Performance In Air Combat," May 18, 1992, vol. 2, pp. 503–509, Institute of Electrical & Electronics Engineers.

*Primary Examiner*—Tan Q. Nguyen
*Attorney, Agent, or Firm*—Bell Seltzer Intellectual Property Group of Alston & Bird, LLP

[57] ABSTRACT

Event debriefing systems and methods are provided for recording a plurality of datastreams related to an event. Each datastream includes chronological information related to at least one aspect of the event. An observer of the event may create time indication marks that facilitate recalling, during debriefing, what transpired at any particular point in time during the event. The recorded datastreams may be retrieved and presented beginning at marked time indications and continued chronologically thereafter in time synchronism.

30 Claims, 7 Drawing Sheets

| MARK NUMBER | CATEGORY | SUB CATEGORY | TIME CODE |
|---|---|---|---|
| 1 | TECHNICAL | V1 CUT | 00:10:00 |
| 2 | HUMAN FACTORS | BRIEFINGS | 01:34:28 |
| 3 | AUTO DETECT | CHECK PILOT REQUESTS LOW OIL, PRESSURE #1 | 01:37:00 |
| 4 | AUTO DETECT | RATE OF DESCENT | 01:42:39 |
| NP PP | NEXT PAGE PREVIOUS PAGE | MORE MARKS PREVIOUS MARKS | ENTER MARK # TO BEGIN PLAY |

FIG. 5.

DEBRIEFING SYSTEMS AND METHODS FOR RETRIEVING AND PRESENTING MULTIPLE DATASTREAMS WITH TIME INDICATION MARKS IN TIME SYNCHRONISM

This invention was made with Government support under grant number 93-G-043 from the Federal Aviation Administration grantee, Embry Riddle Aeronautical University. The Government has certain rights to this invention.

FIELD OF THE INVENTION

The present invention relates generally to event recording systems, and more particularly to systems for debriefing event participants.

BACKGROUND OF THE INVENTION

It is well known throughout the airline industry that flight crew error is a contributing factor in a large number of aircraft accidents. However, many of the errors made by multi-person flight crews have very little to do with the technical aspects of flying an aircraft. Instead, a large number of these errors are related to poor group decision making, ineffective communication, inadequate leadership, and poor task management (collectively referred to as "human factors" errors) among the flight crew.

Flight simulators were developed in the late 1960's and early 1970's to increase flight crew proficiency in the technical aspects of flying. Flight simulators are computer controlled devices which simulate actual flying conditions of an aircraft and train flight crews to deal with a variety of situations before they actually encounter them in a real aircraft. Early on, the airline industry recognized the importance of increasing flight crew proficiency with respect to eliminating human factors errors, and began combining both technical and human factors training during flight simulator exercises. For example, a high-stress environment that requires clear, unequivocal communication between all of the crew members is the loss of an engine on take off. Although often regarded as a technical maneuver, it also requires accurate information transfer between the flight crew, the control tower, and the cabin crew.

Increasing the proficiency of flight crews with respect to human factors knowledge and skills has come to be known as "cockpit resource management" (CRM) training. CRM training typically involves videotaping a flight simulator training exercise for later playback and review by the flight crew during debriefing. Simulators equipped with video cameras can help flight crews sharpen their communication skills and other human factors skills in various emergency situations. Unfortunately, conventional video cassette recorder (VCR) technology presently used to record flight simulator exercises is often inadequate during debriefing. Rewinding and forwarding is often required in order to locate a particular portion of an event recorded on a videotape, and to review a portion of the videotape multiple times. Some degree of time lag is typically involved because it is rather difficult to quickly jump back and forth between different portions of the videotape. Another disadvantage of using conventional VCR technology for capturing a flight simulator training exercise for debriefing purposes is that it is somewhat difficult to simultaneously capture with video cameras, flight data as represented by the various indicators and dials in the simulator, and the actions of the flight crew.

SUMMARY OF THE INVENTION

It is therefore an object of the present invention to provide improved debriefing systems and methods.

It is another object of the present invention to provide improved debriefing systems and methods that overcome the limitations and drawbacks of conventional VCR technology.

These and other objects are accomplished, according to the present invention, by event debriefing systems and methods for recording and replaying various types of information generated during an event, both simulated and real. Facilities are provided for recording a plurality of datastreams related to an event, each datastream including chronological information related to at least one aspect of the event. Recorded datastreams include video recordings of the actions of event participants, and audio recordings of audible communications of event participants. Also included are instrumentation datastreams from various event-monitoring instruments, including those necessary to create aircraft flight animation.

Facilities are provided whereupon, any point in time during an event can be "indicated" with a time indication mark, created either by an observer or automatically by the debriefing system. An observer of the event may create time indication marks that facilitate recalling, during debriefing, what transpired at any particular point in time during the event. The observer is presented with, preferably via a computer display, menus of categories and subcategories of pre-defined time indication marks that can be selected and associated with the event. Similarly, the debriefing system may be configured to automatically create time indication marks when certain parameters are met during the event.

Time indication marks may be defined for virtually any aspect of an event including, but not limited to, categories related to the actions of participants in the event (CRM for example), and categories related to technical aspects of the event. By associating a time during the event with a particular category of time indication marks, selective replay of the various recorded datastreams is facilitated during debriefing. For example, if communications between event participants is good (or bad) at a particular point in time during an event, a pre-defined time indication mark may be selected from a menu and associated with each of the recorded datastreams. During debriefing, the event participants can view the datastreams in time synchronism beginning at or near this time indication mark. Time indication marks that are not pre-defined may also be created and associated with the recorded datastreams. For example, if something were to occur during an event that would be worth reviewing during debriefing, yet does not fall within a particular pre-defined category, an observer can create a time indication mark anyway.

The recorded datastreams are retrieved and presented in time synchronism. In particular, the recorded datastreams can be retrieved and presented beginning at marked time indications and continued chronologically thereafter in time synchronism. During debriefing, a user is presented with various computer screens from which particular time indication marks can be selected. For example, a list of all marks created during an event may be listed. Alternatively, various data from an event, with associated time indication marks, may be presented for selection to a user. By selecting a particular time indication mark, the various recorded datastreams are replayed in time synchronism beginning at or near the time associated with the selected time indication mark.

A display having a plurality of zones is used to present video and instrumentation datastreams in time synchronism. Event-monitoring instrumentation and other data is displayed in dynamic animation. An audio datastream is performed in time synchronism with the displayed video and instrumentation datastreams. Consequently, the disadvantages of conventional VCR technology are overcome by the present invention. Any portion of a recorded event can be reviewed at the press of a button, with virtually no time lag.

The present invention may be used in conjunction with aircraft flight simulator debriefing systems and methods. Data, from both the flight simulator and the video camera on the simulator flight deck, is directed to a computer. A computer screen is configured to display a variety of pre-defined categories of time indication marks. A training facilitator, referred to as a "check pilot", observes crew interactions during the simulator exercise and selects time indication marks from the display. The time indication marks may be associated with various aspects of the simulated flight, including technical and CRM aspects. For example, if the check pilot observes flight crew behavior during a simulated event that would be desirable to review during debriefing, he or she can select a pre-defined time indication mark, or create a mark that is not pre-defined, and associate the mark with the recorded datastreams.

Software associated with the debriefing computer automatically reconstructs the simulator flight, links it to the video and audio signal from the flight deck and displays the digitized video, dynamic animation and selected instrumentation on the monitor located in a debriefing room. During debriefing following a simulator exercise, a check pilot is able to go to any event during the flight and show the crew exactly what transpired on the flight deck, complete with animated instrumentation and multiple views of the aircraft and flight path, all on a single monitor.

The present invention is advantageous because it substantially increases training efficiency and effectiveness by allowing the crew to "relive" their flight experience in a single integrated display of their technical and human factor performance. Another advantage of the debriefing system, according to the present invention, is that a flight crew member can debrief himself or herself after a training exercise. This removes the subjectivity of the check pilot and puts him or her in the position of having to simply manage the interaction between the flight crew and the simulator system. As an additional benefit, the present invention will result in increased standardization of check pilot briefings, debriefings, and evaluations.

Prior to the present invention, marks on videotape lacked identifying information. The check pilot knew that a mark existed, but there was not any descriptive information associated with the mark. Time indication marks, according to the present invention, facilitate the recall of events that transpired in the simulated exercise, particularly at critical junctures, when the exercise is replayed during the debriefing session. Because there is a tremendous amount of stimuli occurring (for example, the flight instruments move dynamically, the visual scenes outside of the cockpit move, and various audio communications take place, including bells, horns, communications between the flight crew and with air traffic control) during a simulated flight exercise, it is difficult for the flight crew and the check pilot to recall all of the events and data that occurred during a session. The cognitive processes of the flight crew and the check pilot cannot assimilate all the stimuli in order to effectively train motor skills and cognitive skills.

As described above, the invention implements systems and methods for: (1) recording, marking, and presenting multiple datastreams in time synchronism; (2) recording, categorized marking, and presenting multiple datastreams in time synchronism; and (3) recording, automatically marking, and presenting multiple datastreams in time synchronism. Each of these aspects may be used individually or in combination, to improve training efficiency and effectiveness during debriefing of an event.

The present invention is not limited to the recording and debriefing of simulated events. Many "real" events can be recorded and the actual event participants debriefed using the present invention. For example, the systems and methods of the present invention can be utilized in the control room of a nuclear power plant, the operating room of a hospital, the control center of the National Aeronautics and Space Administration (NASA) during a space mission, the assembly line of a manufacturing plant, and many other locations involving both technical aspects of an event and interaction among participants in the event. The present invention is a powerful learning tool with many potential applications.

BRIEF DESCRIPTION OF THE DRAWINGS

FIG. 5 illustrates a display screen for selecting a particular time mark from a list of time indication marks during debriefing.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
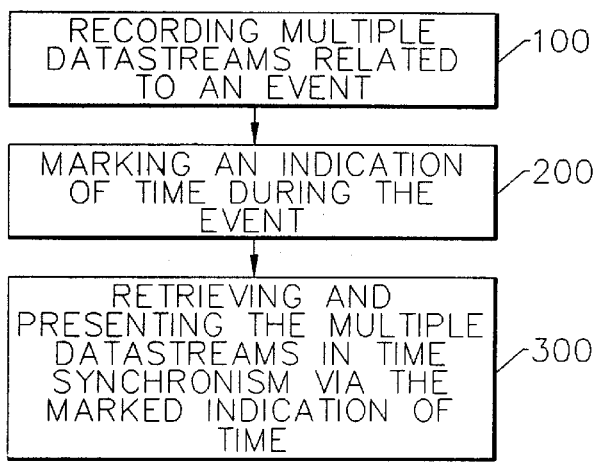
FIG. 1A schematically illustrates operations for recording, marking, and retrieving multiple datastreams, according to the present invention.

Referring now to FIG. 1A, debriefing operations of the present invention include recording multiple datastreams related to an event (Block 100), marking an indication of time during the event (Block 200), and retrieving and presenting the recorded datastreams in time synchronism instantly via the marked indication of time (Block 300). The multiple datastreams may include video, audio, event-monitoring, and instrumentation datastreams. The debriefing system has the capability of digitizing and synchronizing multiple datastreams, displaying the data simultaneously on a computer screen, and permitting instantaneous access to information within each datastream for any particular point in time.

Figure 1B:
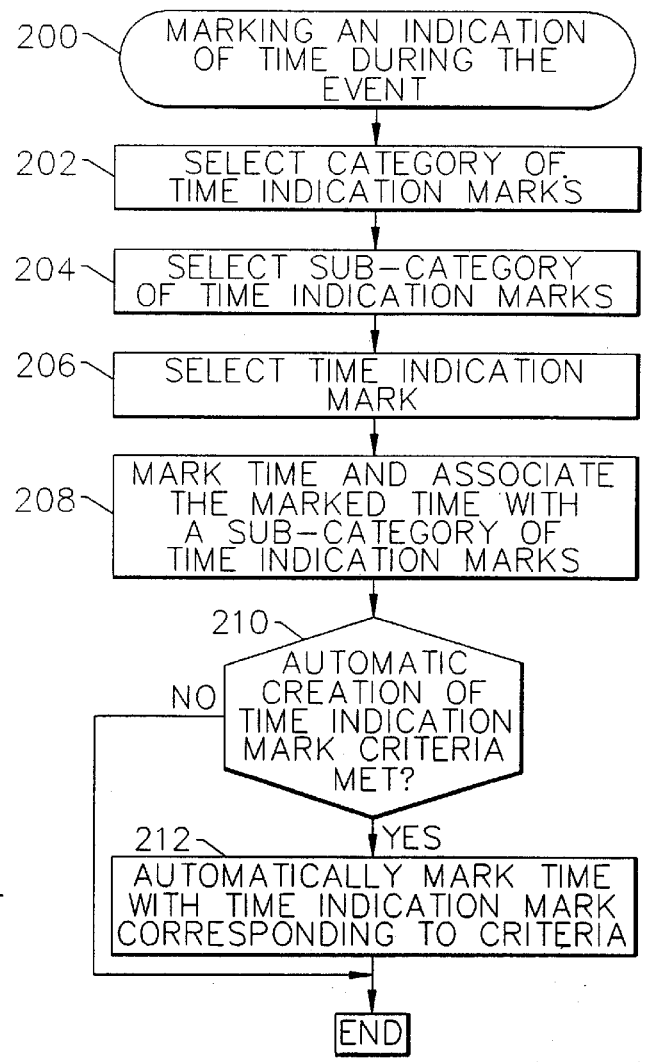
FIG. 1B schematically illustrates operations for marking an indication of time during an event, according to the present invention.

Referring now to FIG. 1B, operations for marking an indication of time during an event will now be described. An observer of an event can associate a time indication mark with recorded information to facilitate review during debriefing. A time indication mark is a field of data containing the category and sub-category headings and a time code for the time that the mark is created. Preferably, a plurality of pre-defined time indication marks are organized by category and sub-category within a respective category (Blocks 202 and 204). An observer is presented with a computer display comprising a plurality of menus, windows, or the like, from which a particular time indication mark can be selected (Block 206). A time code is associated with a selected time indication mark (Block 208).

For example, in an event including multiple interacting participants, if an observer witnesses participant behavior during the event that is particularly good or bad, a pre-defined time indication mark may be selected from the computer display and a time code associated with the selected mark. During debriefing, the event participants can view the datastreams in time synchronism beginning at or near the time represented by this time indication mark. Time indication marks that are not pre-defined may also be created and associated with the recorded datastreams. For example, if something were to occur during an event that would be worth reviewing during debriefing, yet does not fall within a particular pre-defined category, an observer is provided with the ability to create a time indication mark. Additionally, time indications marks may be automatically generated (Blocks 210 and 212). For example, certain events may trigger the creation of time indication marks, independent of an observer.

Figure 1C:
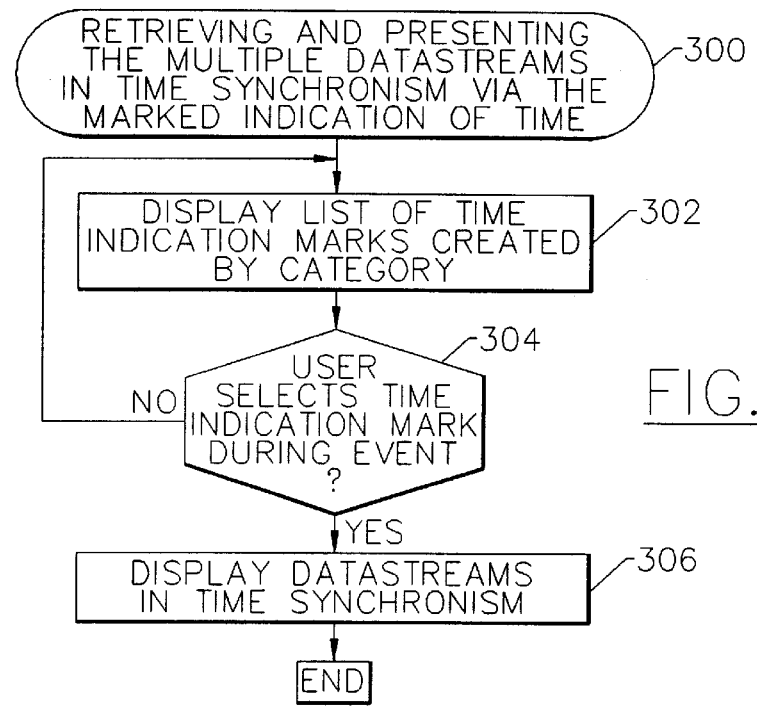
FIG. 1C schematically illustrates operations for retrieving and presenting multiple datastreams in time synchronism via time indication marks, according to the present invention.

Referring now to FIG. 1C, operations for retrieving and presenting the recorded datastreams in time synchronism via a marked indication of time will now be described. During debriefing of an event, a user is presented, preferably via a computer display, a list of time indication marks created during the event (Block 302). If the user selects a time indication mark (Block 304), the multiple recorded datastreams are displayed in time synchronism at or near the point in time represented by the time indication mark (Block 306). Preferably, time indication marks are displayed by category. However, a variety of display configurations may be used to facilitate the selection of a time indication mark by a user.

The present invention permits various time indication marks to be associated with the multiple datastreams whereupon the datastreams can be accessed at these time indication marks during debriefing. The present invention also permits the time indication marks to be selected from a variety of categories, including technical aspects of the recorded event and human interaction aspects of the event participants. The invention is advantageous as a teaching tool for a variety of simulated events, especially those involving multiple participants, where risk and cost of the actual event are high. Exemplary events for which the debriefing system according to the present invention is advantageous include, but are not limited to, aircraft operations, land-based vehicle operations including buses and trains, surgical procedures, maritime simulations, and warfare simulations. The invention is also advantageous as a teaching tool for a variety of real events, especially those involving technical aspects of the event and multiple participants. Exemplary real event locations include, but are not limited to, power plant control rooms, hospital operating rooms, space agency control centers, war strategy rooms, operations centers of airports, air traffic control facilities, television broadcast rooms, the bridge of a ship, sports events, negotiation/mediation rooms, and various industrial and manufacturing facilities.

In one embodiment, the present invention includes debriefing systems and methods used in conjunction with an aircraft flight simulator. Flight crew performance in a flight simulator exercise is generally measured via two components: technical proficiency and human factors or CRM proficiency. The technical component of flight crew performance includes, but is not limited to: knowledge and skills relating to aircraft systems; normal, abnormal and emergency operating procedures; air traffic control (ATC) procedures; instrument flight procedures; and navigation and charts. The CRM component of flight crew performance includes, but is not limited to: communication skills; team building; the exercise of command and use of leadership; decision making; and management of resources, workload and stress.

The present invention comprises software, hardware, and interfaces necessary for capturing multiple datastreams from the flight simulator, and from video cameras and microphones in the simulator cockpit. Data from the flight simulator includes flight and engine instrumentation data, and other data required to create animated instrumentation and aircraft position displays. Typically, these datastreams are generated in digital format. On the other hand, the audio and video datastreams are typically generated in analog format. The present invention may convert analog datastreams into digital datastreams. Furthermore, the present invention can synchronize and store the multiple datastreams. An important aspect of the present invention is the ability to create various time indication marks that can be associated with the recorded datastreams. The time indication marks permit virtually instant access to the multiple datastreams during debriefing.

During a typical flight simulator debriefing session following a simulated flight exercise, the present invention displays the digitized video datastream in time synchronism with dynamic animation of flight instrumentation and plane position in a series of windows on a computer monitor. Audio playback, also in time synchronism with the displayed video and animated datastreams, is provided through a speaker system. Thus, plane position, instrument readings, and crew actions/interactions at any point in time can be viewed easily. During playback, the various synchronized datastreams can be fast forwarded, and reversed to virtually any point in time during the flight exercise with almost no delay.

Figure 2:
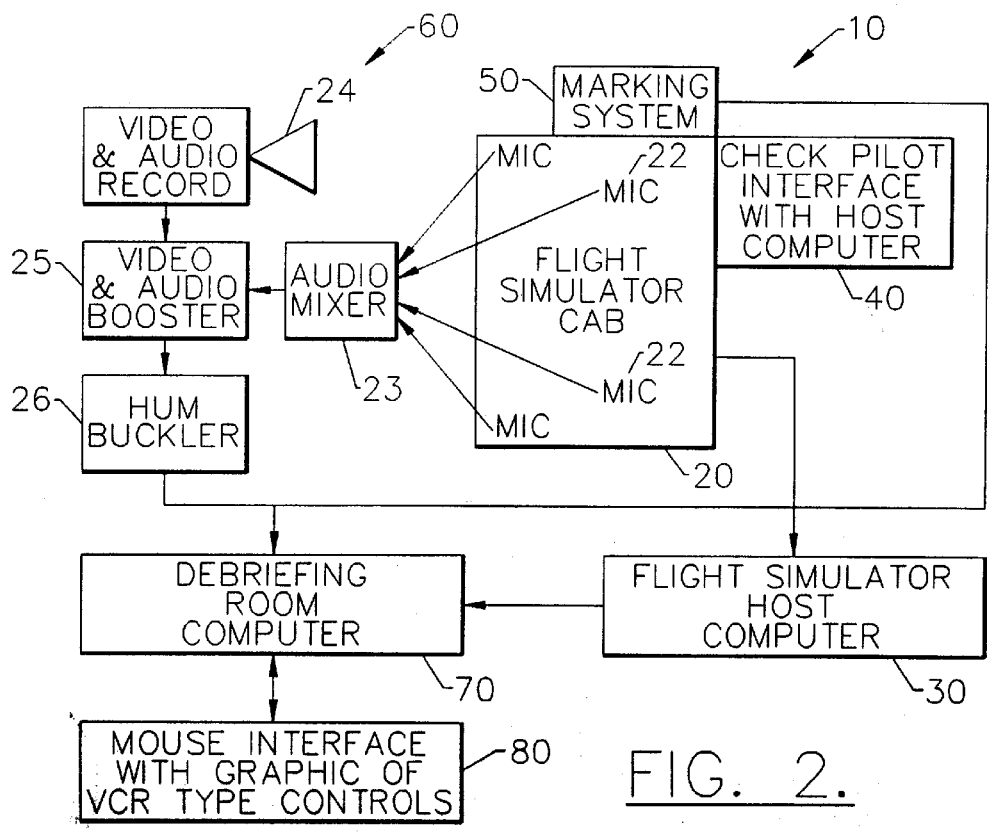
FIG. 2 schematically illustrates a hardware configuration of the present invention when used in conjunction with a flight simulator.

Referring now to FIG. 2, a preferred hardware configuration of the present invention, when utilized as a debriefing system in conjunction with a flight simulator, is schematically illustrated. In general, the components of the debriefing system 10 include a flight simulator cab 20, a flight simulator host computer 30, a check pilot interface 40, a marking system 50, audio and video recording system 60, a debriefing computer 70, and a user interface 80 for the debriefing computer. As is known by those having skill in the art, a flight crew undergoes a flight training exercise within the flight simulator cab 20, which is controlled by the flight simulator host computer 30. The instrumentation within the flight simulator cab 20, which is typically a reproduction of the cockpit of a particular aircraft, is under computer control via the host computer 30. Control over a training exercise is provided to a check pilot via the check pilot interface 40.

In the illustrated embodiment, the flight simulator cab 20 is fitted with a plurality of microphones 22 for recording the audible communications of flight crew members. In a typical configuration, four (4) cockpit microphones are used in conjunction with a cockpit-wide area microphone, Captain and First Officer boom microphones, and panel-mounted microphones. An audio mixer 23 combines the audio input from each microphone into a single audio source. The actions of the flight crew are recorded via one or more video cameras 24 located within the flight simulator cab 20. Preferably, each video camera 24 is an infrared low light camera. A video and audio booster 25 boosts the video and audio analog datastreams over long distances between the recording system 60 and the debriefing room computer 70, thereby facilitating the subsequent digitization of these datastreams. A hum buckler 26 is preferably provided to minimize audio and video datastream noise over long distances between the recording system 60 and the debriefing room computer 70. However, the present invention is not limited to analog video and audio recording devices. Digital recording devices, including charge coupled device (CCD) cameras, may be utilized.

The present invention incorporates critical flight information with digitized audio and video obtained directly from the simulator. This information is instantly reproduced in a configurable display of the debriefing room computer 70. The monitor preferably provides a chase plane view from any vantage point which enhances situation awareness during debriefing. Preferably, the debriefing room computer 70 is a Silicon Graphics Model R4000, or equivalent, having: audio and video capture and playback boards; serial or Ethernet communications ports; a keyboard, a monitor suitable for viewing by small groups, a mouse, and data storage capacity of at least four (4) gigabytes. Even more preferable is data storage of at least eight (8) gigabytes. Software on the debriefing room computer 70 performs the following tasks: capture and store video and audio datastreams; store flight instrumentation datastreams and other datastreams from the simulator; store data from the marking system personal computer; replay audio and video datastreams; and replay flight simulator data in 4D animation. 4D animation provides the ability to view three dimensional (3D) animation from any point in space. Preferably, the movement of a computer mouse to any point around an object will allow a user to observe the object from that point in space. In addition, software is provided that makes the 4D animator speed up or slow down the frame rate replay to keep in synchronism with the video replay.

Software is also provided that decodes simulator flight instrument indications into exceedances. The term exceedance refers to something that happened that should not have happened. For example, if an aircraft exceeds a maximum speed, this would be an exceedance. The maximum speed for an aircraft is stored in a computer file. The maximum speed may be further qualified by condition sets, such as maximum speed at a particular altitude. The program constantly compares the speed of the simulated aircraft with the file to determine if the maximum speed has been exceeded. If it has been exceeded, a mark and exceedance is created.

Control over the debriefing computer 70 is maintained through a mouse-driven user interface, preferably having various menus for start up and configuration. In addition, it is preferred that the user interface have a panel similar to the protocol used by a VCR interface, thereby facilitating ease of use. For example, "fast forward", "rewind", "play", "pause", and "stop" buttons are displayed on the screen. Preferably, buttons are provided for jumping to the previous or next time indication mark. The user can control playback during debriefing simply by clicking on the appropriate button displayed on the screen. All windows on the debriefing computer monitor are synchronized to remain in balance with the video during playback. Audio is provided through a speaker system linked with the debriefing computer and is fully synchronized with the video and graphics display.

Figure 4:
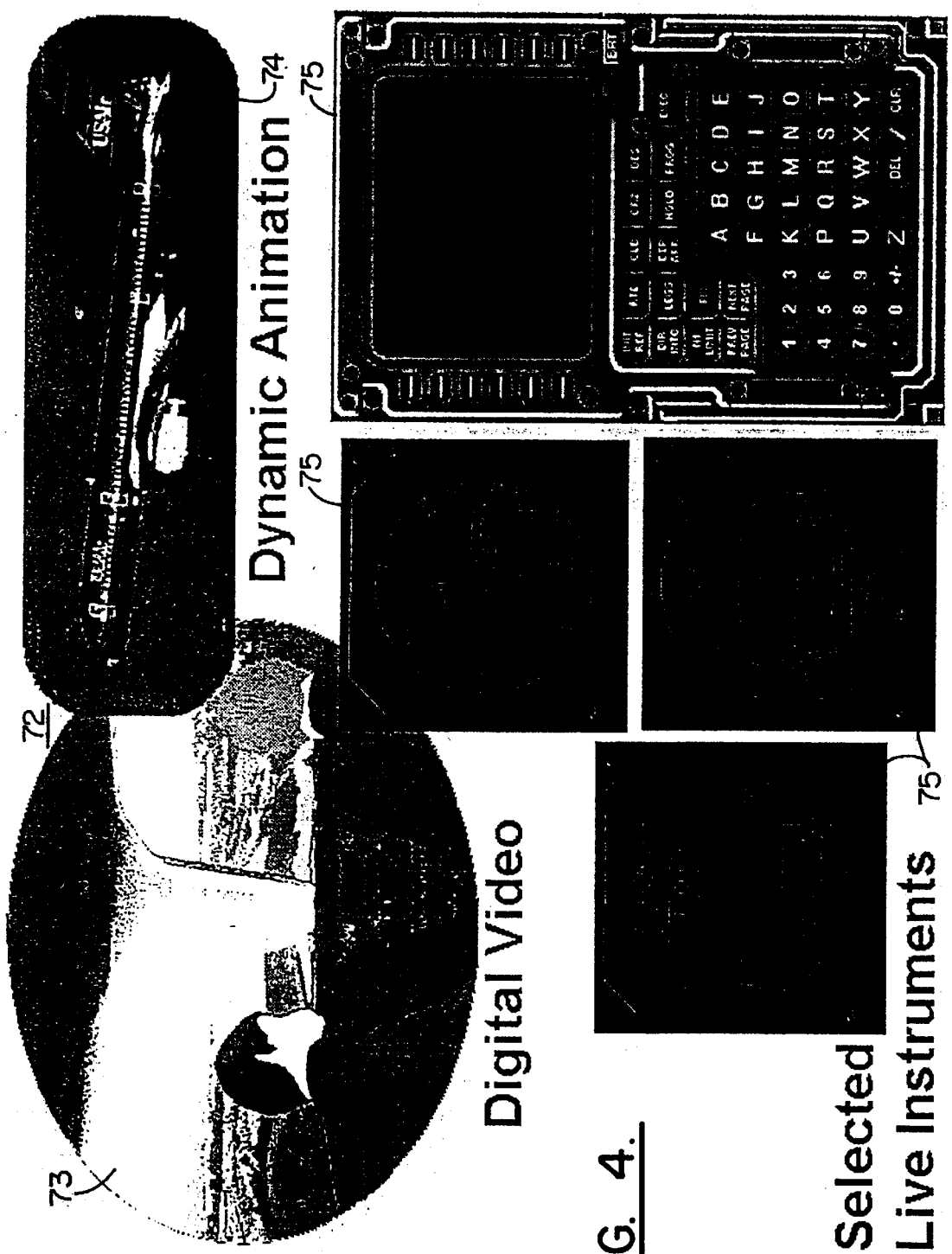
FIG. 4 illustrates an integrated debriefing computer display according to the present invention, when used in conjunction with a flight simulator.

Referring now to FIG. 4, a preferred embodiment of the debriefing computer display 72, when used in conjunction with a flight simulator, is illustrated. Preferably, the display is a thirty-five inch (35") color monitor with at least four (4) different windows. A fifth window may be provided for displaying a list of time indication marks. The configurable display windows can be enlarged, moved, and reduced as desired. In the illustrated configuration, video display window 73 displays a digital video recording of a flight crew during a simulator exercise. Plane position display window 74 illustrates the position of an airplane from a variety of view points at any stage during a simulated flight exercise. In addition, ideal plane positions may be superimposed over actual plane positions in the plane position display window 74. The plane position window 74 also may display pertinent information such as glide slope and weather features. Instrumentation display windows 75 contain animated displays of selected aircraft instrumentation, configurable depending on the type of aircraft being "flown" in the simulator, and the particular simulated flight exercise involved. The animated instrumentation is a precise reproduction of the appearance of the actual instrumentation in the cockpit of the simulator. The animation is dynamic in that the various instruments displayed appear to present data in real time. For example, the ground speed indicator and altimeter illustrated in FIG. 4 give continuous readings during playback of a particular portion of the simulated exercise.

All display windows are synchronized such that the dynamic instrumentation and plane position animation, and digital video and audio of flight crew actions, represent what transpired at a particular point in time during the recorded exercise. Because all displayed video and instrumentation data is in digital format, any point in time during the recorded flight exercise can be accessed instantly. In addition, as described in greater detail hereinafter, time indication marks can be created, both manually by the check pilot, automatically by an exceedance routine, and automatically by the simulator, at various points in time during the recording of the flight exercise so that, during debriefing, these particular points in time can be accessed instantly.

Each time indication mark facilitates quick access to what transpired at that particular point in time during the simulated flight exercise when the recorded datastreams are played back during debriefing. During debriefing, the flight crew can observe their actions, listen to their communications, observe flight instrumentation and plane position prior to, simultaneously with, and subsequent to any time mark. For example, the recorded datastreams can be replayed beginning ten (10) seconds prior to a given time mark and continued therefrom. A plethora of replay options are made possible by the present invention, and are not limited to those described herein. The many possible replay options create a valuable tool for event participants to use in learning from an actual or simulated event.

The marking system 50 permits a check pilot to create time indication marks during a simulated flight exercise and to associate one or more categories of performance factors with the time marks. Preferably, the marking system 50 is controlled by a personal computer having a "touch screen" display, and is located in the flight simulator cab 20. The marking system user interface presented on the touch screen is described in detail below and is designed to facilitate ease of use by the check pilot. However, non-touch screen computer monitors may be utilized as well to present the marking system user interface. Conventional selection techniques including keyboard and mouse functions may also be used to create time indication marks.

The marking system 50 includes software for producing a main menu and hierarchial sub-menus on the marking system display and for sending time mark data to the debriefing room computer 70. Preferably, the marking system 50 is connected to the debriefing room computer 70 via an Ethernet link or a serial port cable. In addition, the marking system 50 provides the check pilot with the ability to control the recording of the various video, audio, and instrumentation datastreams by the debriefing room computer 70. The marking system 50 instructs the debriefing system when to start, stop, and mark.

Figure 3:
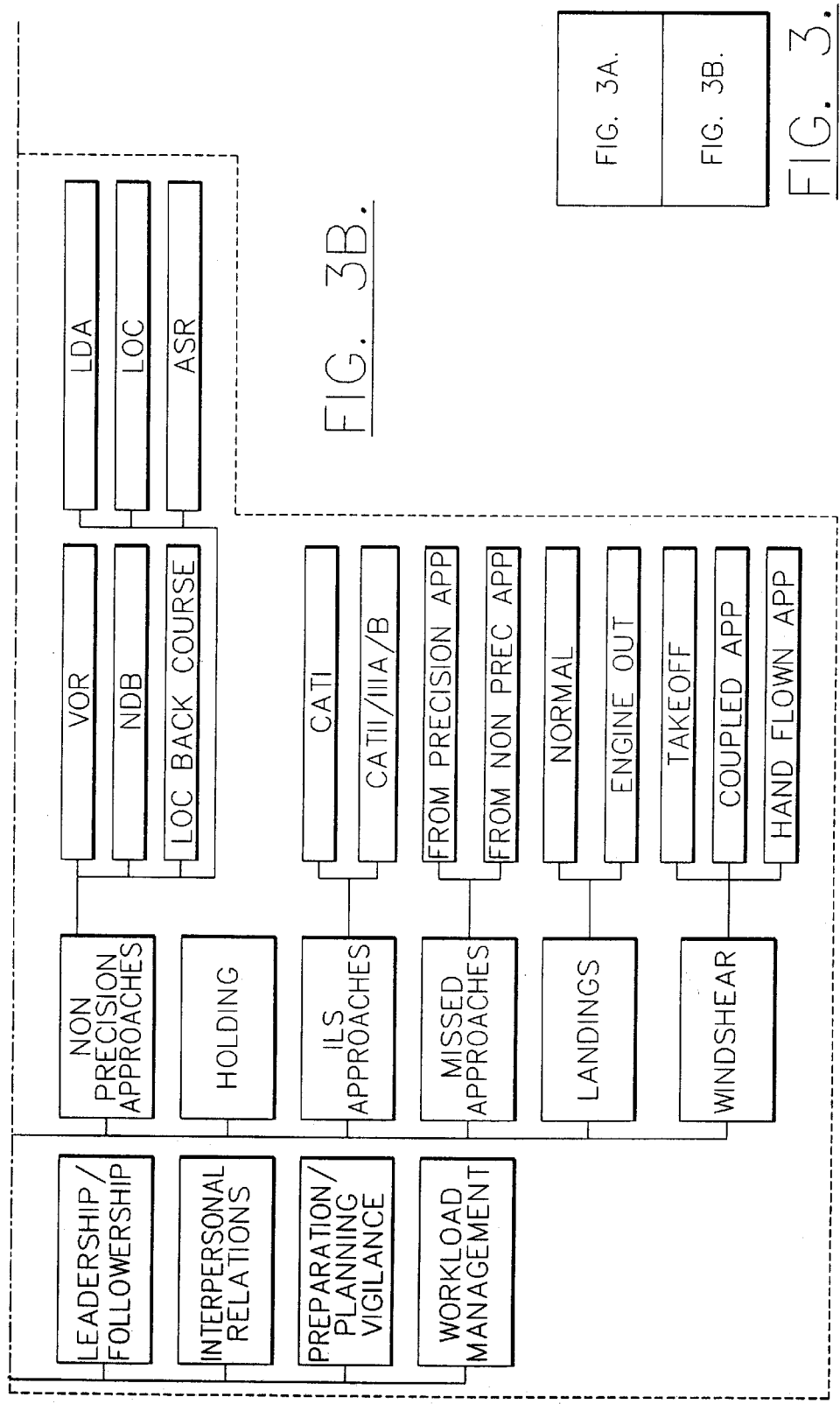
FIG. 3 is a hierarchial menu of time indication marks when the present invention is used in conjunction with a flight simulator.
Figure 3A:
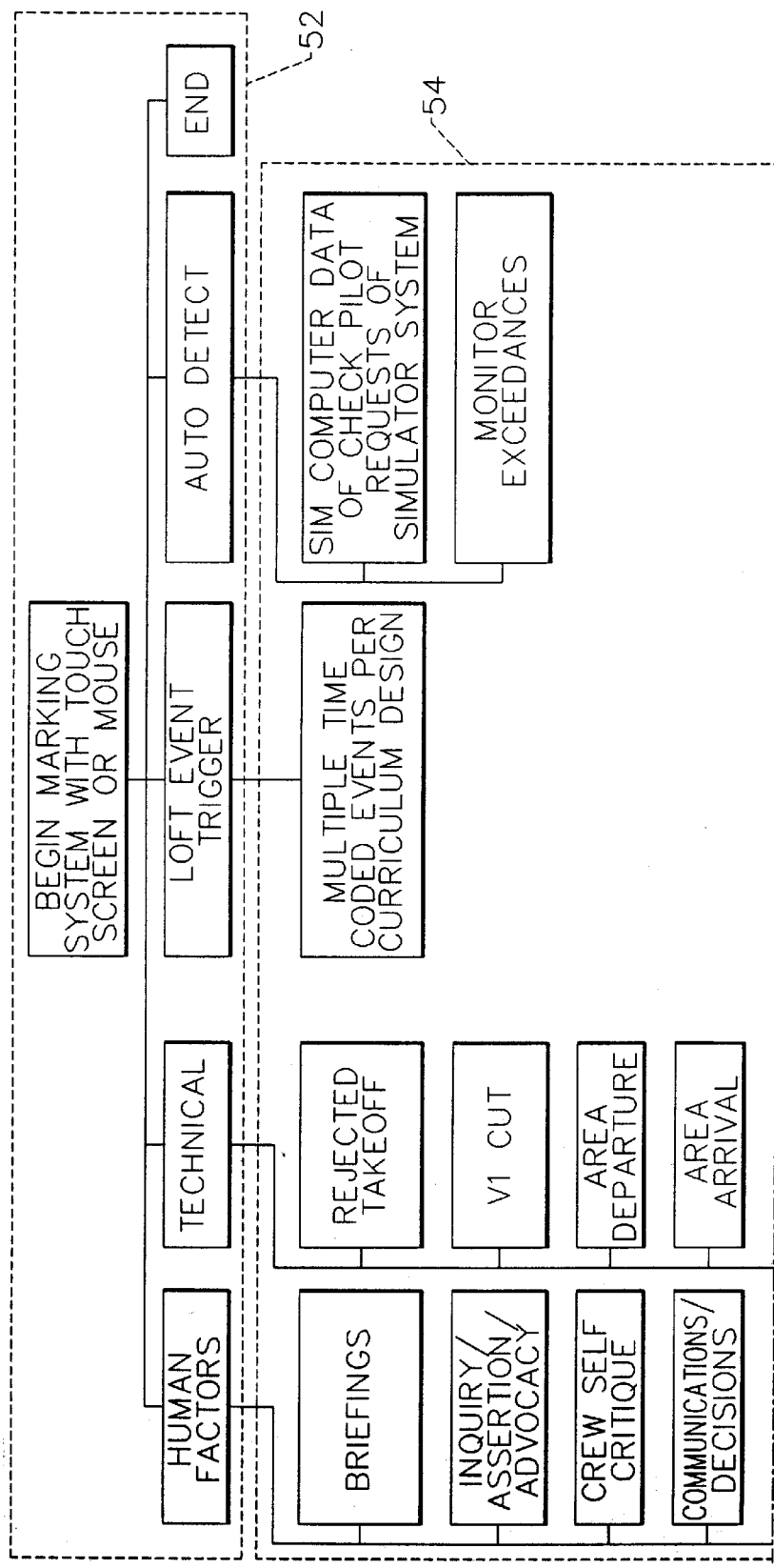

During a flight simulation exercise, the check pilot is presented with a main menu 52, as shown at the top of FIG. 3, on the marking system display that includes the following categories of time indication marks: Human Factors, Technical, LOFT Event Trigger, Auto Detect, and End. From this main menu 52, the check pilot is presented with sub-categories 54 within each category, as illustrated in FIG. 3. Each sub-category preferably contains a plurality of pre-defined time indication marks that can be selected as described below. Pre-defined time indication marks and their respective categories and sub-categories may be presented to the user in a variety of ways, and are not limited to menus. Other methods of presenting categories and sub-categories of time indication marks to a user include using separate windows or icons.

A time indication mark is defined as a field of data containing the main category heading, the sub-category heading(s), and a time code index at the time that the mark is received on the debriefing room computer 70. After each mark is selected, the time indication mark data is stored on the debriefing room computer 70, and the marking system 50 returns to the main menu of time mark categories, ready for the next time mark.

Sub-categories of the Human Factors marks include, but are not limited to: "Briefings", "Inquiry/Assertion/Advocacy", "Crew Self Critique", "Communications/Decisions", "Leadership/Followership", "Interpersonal Relations", "Preparation/Planning/Vigilance", and "Workload Management." These sub-categories are recommended by the Federal Aviation Administration (FAA) in the Crew Resource Management Advisory Circular (AC 120-51), which is incorporated herein by reference in its entirety. These sub-categories are CRM issues that airline training departments around the world have adopted as criteria, goals, and models towards which they strive to attain proficiency in. Tables 1–8 below set forth illustrative pre-defined time indication marks for each of the above-listed human factors sub-categories.

TABLE 1

Briefings
The effective briefing is interesting and thorough. It addresses coordination, planning, and problems. Although briefings are primarily a captain's responsibility, other crew members may add significantly to planning and should be encouraged to do so.

Time Indication Marks and Descriptions

The briefing establishes an environment for open/interactive communications (for example, the captain calls for questions or comments, answers questions directly, listens with patience, does not interrupt or "talk over," does not rush through the briefing, and makes eye contact as appropriate).
The briefing is interactive and emphasizes the importance of questions, critique, and the offering of information.
The briefing establishes a "team concept" (for example, the captain uses "we" language, encourages all to participate and to help with the flight).
The briefing covers pertinent safety and operational issues.
The briefing identifies potential problems such as weather, delays, and abnormal system operations.
The briefing provides guidelines for crew actions; division of labor and crew workload is addressed.
The briefing includes the cabin crew as part of the team.
The briefing sets expectations for handling deviations from standard operating procedures.
The briefing establishes guidelines for the operation of automated systems (for example, when systems will be disabled; which programming actions must be verbalized and acknowledged).
The briefing specifies pilot flying and pilot not flying duties and responsibilities with regard to automated systems.

TABLE 2

Inquiry/Advocacy/Assertion
These behaviors relate to crewmembers' promoting the course of action that they feel is best, even when it involves conflict with others.

Time Indication Marks and Descriptions

Crewmembers speak up and state their information with appropriate persistence until there is some clear resolution.
"Challenge and response" environment is developed.
Questions are encouraged and are answered openly and nondefensively.
Crewmembers are encouraged to question the actions and decisions of others.
Crewmembers seek help from others when necessary.
Crewmembers question status and programming of automated systems to confirm situational awareness.

TABLE 3

Crew Self-Critique Regarding Decisions and Actions
These behaviors relate to the effectiveness of a group and/or an individual crewmember in critique and debriefing. Areas covered should include the product, the process, and the people involved. Critique may occur during an activity, and/or after completing it.

Time Indication Marks and Descriptions

Critique occurs at appropriate times, which may be times of low or high workload.
Critique deals with positive as well as negative aspects of crew performance.
Critique involves the whole crew interactively.
Critique makes a positive learning experience. Feedback is specific, objective, usable, and constructively given.
Critique is accepted objectively and nondefensively.

TABLE 4

Communications/Decisions
These behaviors relate to free and open communication. They reflect the extent to which crewmembers provide necessary information at the appropriate time (for example, initiating checklists and alerting others to developing problems). Active participation in the decision making process is encouraged. Decisions are clearly communicated and acknowledged. Questioning of actions and decisions is considered routine.

Time Indication Marks and Descriptions

Operational decisions are clearly stated to other crewmembers.
Crewmembers acknowledge their understanding of decisions.
"Bottom lines" for safety are established and communicated.
The "big picture" and the game plan are shared within the team, including flight attendants and others as appropriate.
Crewmembers are encouraged to state their own ideas, opinions, and recommendations.
Efforts are made to provide an atmosphere that invites open and free communications.
Initial entries and changed entries to automated systems are verbalized and acknowledged.

TABLE 5

Leadership Followership/Concern for Tasks
These behaviors relate to appropriate leadership and followership. They reflect the extent to which the crew is concerned with the effective accomplishment of tasks.

Time Indication Marks and Descriptions

All available resources are used to accomplish the job at hand.
Flight deck activities are coordinated to establish an acceptable balance between respect for authority and the appropriate practice of assertiveness.
Actions are decisive when the situation requires.
A desire to achieve the most effective operation possible is clearly demonstrated.
The need to adhere to standard operating

TABLE 5-continued

Leadership Followership/Concern for Tasks
These behaviors relate to appropriate leadership and followership. They reflect the extent to which the crew is concerned with the effective accomplishment of tasks.

Time Indication Marks and Descriptions practices is recognized.
Group climate appropriate to the operational situation is continually monitored and adjusted (for example, social conversation may occur during low workload, but not high).
Effects of stress and fatigue on performance are recognized.
Time available for the task is well managed.
Demands on resources posed by operation of automated systems are recognized and managed.
When programming demands could reduce situational awareness or create work overloads, levels of automation are reduced appropriately.

TABLE 6

Interpersonal Relationships/Group Climate
These behaviors relate to the quality of interpersonal relationships and the pervasive climate of the flight deck.

Time Indication Marks and Descriptions

Crewmembers remain calm under stressful conditions.
Crewmembers show sensitivity and ability to adapt to the personalities of others.
Crewmembers recognize symptoms of psychological stress and fatigue in self and in others (for example, recognizes when he/she is experiencing "tunnel vision" and seeks help from the team; or notes when a crewmember is not communicating and draws him/her back into the team).
"Tone" in the cockpit is friendly, relaxed, and supportive.
During times of low communication, crewmembers check in with others to see how they are doing.

TABLE 7

Preparation/Planning/Vigilance
These behaviors relate to crews' anticipating contingencies and the various actions that may be required. Excellent crews are always "ahead of the curve" and generally seem relaxed. They devote appropriate attention to required tasks and respond without undue delay to new developments. (They may engage in casual social conversation during periods of low workload and not necessarily diminish their vigilance.)

Time Indication Marks and Descriptions

Demonstrating and expressing situational awareness; for example, the "model" of what is happening is shared within the crew.
Active monitoring of all instruments and communications and sharing relevant information with the rest of the crew.
Monitoring weather and traffic and sharing relevant information with the rest of the crew.

TABLE 7-continued

Preparation/Planning/Vigilance
These behaviors relate to crews' anticipating contingencies and the various actions that may be required. Excellent crews are always "ahead of the curve" and generally seem relaxed. They devote appropriate attention to required tasks and respond without undue delay to new developments. (They may engage in casual social conversation during periods of low workload and not necessarily diminish their vigilance.)

Time Indication Marks and Descriptions

Avoiding "tunnel vision" caused by stress; for example, stating or asking for the "big picture".
Being aware of factors such as stress that can degrade vigilance and watching for performance degradation in other crewmembers.
Staying "ahead of the curve" in preparing for planned situations or contingencies.
Ensuring that cockpit and cabin crewmembers are aware of plans.
Including all appropriate crewmembers in the planning process.
Allowing enough time before maneuvers for programming of the flight management computer.
Ensuring that all crewmembers are aware of initial entries and changed entries in the flight management system.

TABLE 8

Workload Distributed/Distractions Avoided
These behaviors relate to time and workload management. They reflect how well the crew manages to prioritize tasks, share the workload, and avoid being distracted from essential activities.

Time Indication Marks and Descriptions

Crewmembers speak up when they recognize work overloads in themselves or in others.
Tasks are distributed in ways that maximize efficiency.
Workload distribution is clearly communicated and acknowledged.
Nonoperational factors such as social interaction are not allowed to interfere with duties.
Task priorities are clearly communicated.
Secondary operational tasks (for example, dealing with passenger needs and communications with company) are prioritized so as to allow sufficient resources for primary flight duties.
Potential distractions posed by automated systems are anticipated, and appropriate preventive action is taken, including reducing or disengaging automated features as appropriate.

Should the check pilot in the simulator observe either positive or negative behavior in these sub-categories, he or she will indicate that observation by creating one of the above, or other, time indication marks. Preferably, the creation of the time indication mark is accomplished by touching one of these listed time indication marks on the touch screen. However, a time indication mark may be created in ways other than via a touch screen, such as via a mouse or keyboard function. In addition, time indication marks may be created that are not pre-defined within a particular category or sub-category. For example, if something were to occur during a simulated event that would be worth reviewing during debriefing, yet does not fall within a particular pre-defined category, a check pilot can create a generic time indication mark to mark this particular point in time during the simulated event.

Technical sub-categories of time indication marks include the minimum number of maneuvers that a flight crew should be able to perform proficiently. These sub-categories may vary from one country to another, but the majority of them are standard among airlines of the world. Generally, these sub-categories include, but are not limited to: "Rejected Takeoff", "V1 Cut", "Area Departure", "Area Arrival", Non Precision Approaches", "Holding", "ILS Approaches", "Missed Approaches", "Landings", and "Windshear." As shown, various sub-categories of these sub-categories exist. The check pilot in the simulator may select time indication marks from any of the technical sub-categories.

"LOFT" is the acronym for "Line Oriented Flight Training." The airline industry has been moving away from proficiency-based maneuvers of a technical nature and more towards simulations that are closely oriented towards actual line operations. The term "line operations" refers to flying with passengers. The emphasis is on human factors training and evaluation, rather than on motor skills, training, demonstration, and evaluation. A "LOFT" event trigger is defined as an external event that is introduced into a simulated flight exercise and that is specifically designed to induce a human factors event. For example, an engine oil temperature gauge may show an erratic reading during a simulated flight to distract the flight crew. The distraction may lead to failure of workload management or communications between the flight crew. The focus during debriefing would be to manage the distraction so that the flight may successfully continue notwithstanding the distraction. The check pilot in the simulator may select time indication marks from any LOFT categories and sub-categories.

"Auto Detect" includes various automatically-created time indication mark sub-categories. Exemplary sub-categories include: when the check pilot initiates certain simulator functions, and when certain performance parameters are exceeded. For example, a time indication mark may be automatically created when the check pilot requests the simulator to induce windshear. As another example, a time indication mark may be automatically created when the aircraft is operated in excess of a particular airspeed at a particular altitude. Automatically created time indication marks can be numerous and it is expected that users will customize the present invention to fit particular needs.

Referring now to FIG. 5, a debriefing room computer display screen 82 for selecting a particular time indication mark from a list of time indication marks 83 during debriefing is illustrated. A user enters the number of the time indication mark in the field labeled "Enter Mark #" and presses a keyboard or mouse function to begin playback of the various datastreams at the point in time indicated by the selected mark. The screen 82 permits the user to view additional screen listings of time marks through "next page" and "previous page" functions and their equivalents. Alternatively, a display of elapsed time at a particular mark may be presented along with controls for playback from a selected elapsed time.

As shown, a time code 84, representing a point in time during a particular recorded flight exercise, is associated with each time indication mark. In addition, both a mark category 85 and sub-category 86 are associated with each time indication mark. For example, as shown in FIG. 5, at a time equal to ten (10) seconds into a particular flight exercise, a time mark was created for a "V1 Cut" technical maneuver. Upon selecting this mark during debriefing, the display illustrated in FIG. 4 would replay, in digital format and in time synchronism, the video of the flight crew, the plane position, and various flight instrumentation beginning at ten (10) seconds into the flight exercise. However, it is to be understood that the present invention permits replay to be configurable whereupon it can begin and end before, after, or precisely at the ten (10) second mark.

Figure 6:
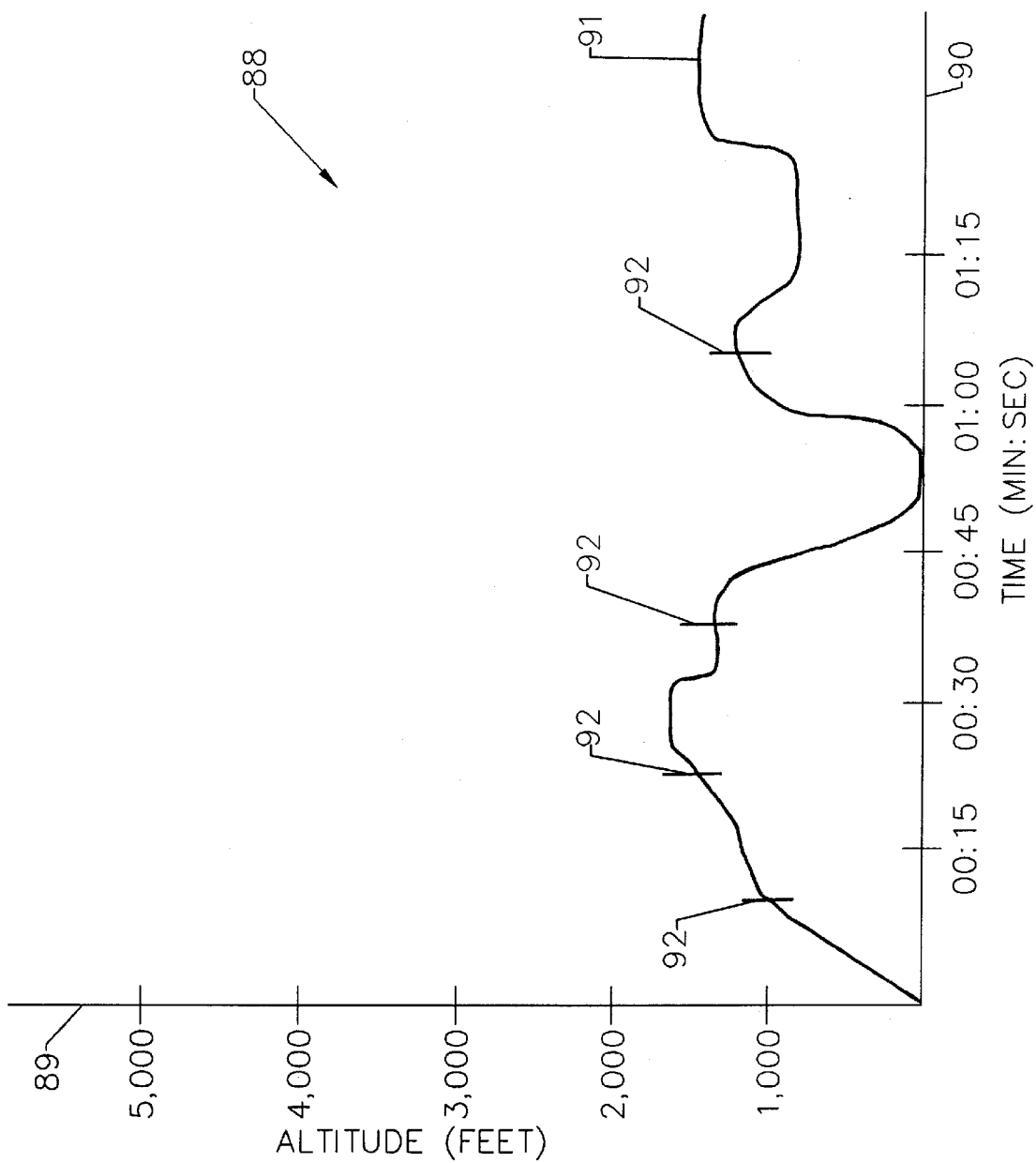
FIG. 6 illustrates an alternative display screen for selecting time indication marks during debriefing.

Referring now to FIG. 6, another debriefing room computer display screen 88 for selecting time indication marks during debriefing is illustrated. The illustrated screen displays a plot 91 of aircraft altitude during a particular segment of a flight exercise. Altitude in feet is plotted along the "y" axis 89, and time is plotted along the "x" axis 90. Vertical marks 92 represent time indication marks created via the marking system 50 during a simulated flight exercise. During the simulated flight exercise, the marks were either automatically created by the simulator, or by the check pilot as described previously.

During debriefing, a user selects a particular mark by "clicking" on the mark with a mouse. When selected, the details of what happened at that point in time can be displayed on the debriefing room computer monitor as previously described above. In addition, when a mark is selected, preferably a window containing the data for the selected time indication mark is displayed. Preferably, the time marks are color-coded based on the type of mark to facilitate easy recognition. For example, some or all of the vertical marks 92 in FIG. 6 may be magenta to represent Technical marks. Some or all of the vertical marks 92 in FIG. 6 may be red to represent Human Factors marks. Some or all of the vertical marks 92 in FIG. 6 may be yellow may to represent LOFT Event Trigger marks. Some or all of the vertical marks 92 in FIG. 6 may be white to represent Auto Detect marks. In addition, the screen has zoom-in and zoom-out capability, to facilitate easy use should an area of the screen become cluttered with marks.

According to another aspect of the present invention, video examples of appropriate flight crew behavior, may be instantly available for a particular event during a simulator exercise. For example, if a CRM error occurs during a session, the system, if prompted during debriefing or briefing will respond with a video example of crew actions/interactions that would be appropriate for the particular event.

The systems and methods according to the present invention can be used as a teaching tool for a variety of events. For example, during a surgical procedure, a video camera can be used to record the event. The system can be configured to interface with the video camera as well as with instrumentation used during the procedure, such as monitors, respirators, and the like. The video and/or audio signal is digitized and synchronized with the instrumentation data, and then stored. Subsequently, the stored video and instrumentation data can be displayed, thereby showing the actions/interactions of a surgical team simultaneously with various instrumentation readings. The end result is a valuable teaching aid for use in debriefing the surgical team and for training others.

The present invention is a vast improvement over existing tools for debriefing training exercises and real events. The present invention increases training efficiency and effectiveness by allowing trainees to "relive" their training or operations experience via a single integrated display of their performance with respect to both technical aspects and human factors aspects. In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An event debriefing system comprising:

means for recording a plurality of datastreams related to an event which occurs over an extended time period, each datastream including chronological information related to at least one aspect of the event over the extended time period;

categorized marking means, for marking times during the extended time period and for associating a category with the marked times; and presenting means, responsive to said marking means, for retrieving information from said datastreams based upon the marked times in a selected category, and for presenting the retrieved information from the datastream for the marked times in the selected category.

2. An event debriefing system according to claim 1, wherein said associated category includes a category related to actions of human participants in said event.

3. An event debriefing system according to claim 1, wherein said associated category includes a category related to technical parameters of said event.

4. An event debriefing system according to claim 1, wherein said synchronized presenting means comprises means for retrieving information from said datastreams beginning at the marked time and continuing chronologically thereafter, and for presenting the retrieved information from the datastreams in time synchronism.

5. An event debriefing system according to claim 1, wherein said recording means comprises:

video recording means for producing a video datastream of actions of event participants;

audio recording means for producing an audio datastream of audible communications of event participants; and instrumentation recording for producing an instrumentation datastream from various event monitoring instruments.

6. An event debriefing system according to claim 4 wherein said synchronized presenting means comprises a display having a plurality of zones, and wherein said video and instrumentation datastreams are presented in a respective one of said plurality of zones in time synchronism.

7. An event debriefing system according to claim 5 wherein said synchronized presenting means comprises means for performing said audio datastream with said displayed video and instrumentation datastreams in time synchronism.

8. An event debriefing system according to claim 1 wherein said marking means is responsive to user identification of a time during said extended time period.

9. An event debriefing system according to claim 1, wherein said synchronized presenting means includes means for displaying the appearance of selected instrumentation.

10. An aircraft flight simulator debriefing system, comprising:

an aircraft flight simulator for simulating aircraft flight;

means for recording a plurality of datastreams related to a simulated aircraft flight, each datastream including chronological information related to at least one aspect of the simulated aircraft flight;

categorized marking means, for marking times during the simulated aircraft flight and for associating a category with the marked times; and presenting means, responsive to said marking means, for retrieving information from said datastreams based upon the marked times in a selected category, and for presenting the retrieved information from the datastream for the marked times in the selected category.

11. An aircraft flight simulator debriefing system according to claim 10, wherein said associated category includes a category related to actions of human participants in said simulated aircraft flight.

12. An aircraft flight simulator debriefing system according to claim 10, wherein said associated category includes a category related to technical parameters of said simulated aircraft flight.

13. An aircraft flight simulator debriefing system according to claim 10, wherein said synchronized presenting means comprises means for retrieving information from said datastreams beginning at the marked time and continuing chronologically thereafter, and for presenting the retrieved information from the datastreams in time synchronism.

14. An aircraft flight simulator debriefing system according to claim 10, wherein said recording means comprises:

video recording means for producing a video datastream of actions of event participants;

audio recording means for producing an audio datastream of audible communications of event participants; and instrumentation recording for producing an instrumentation datastream from various event monitoring instruments.

15. An aircraft flight simulator debriefing system according to claim 14 wherein said synchronized presenting means comprises a display having a plurality of zones, and wherein said video and instrumentation datastreams are presented in a respective one of said plurality of zones in time synchronism.

16. An aircraft flight simulator debriefing system according to claim 15 wherein said synchronized presenting means comprises means for performing said audio datastream with said displayed video and instrumentation datastreams in time synchronism.

17. An aircraft flight simulator debriefing system according to claim 10 wherein said marking means is responsive to user identification of a time during said simulated aircraft flight.

18. An aircraft flight simulator debriefing system according to claim 10, wherein said synchronized presenting means includes means for displaying the appearance of selected aircraft flight instrumentation.

19. A method of event debriefing comprising the steps of:

recording a plurality of datastreams related to an event which occurs over an extended time period, each datastream including chronological information related to at least one aspect of the event over the extended time period;

marking a time during the extended time period, wherein said step of marking a time during the extended time period further comprises associating a category with the marked times; and retrieving information from said datastreams based upon the marked times in a selected category, and presenting the retrieved information from the datastreams for the marked times in the selected category in time synchronism.

20. A method of event debriefing according to claim 4, wherein said step of associating a category includes associating a category related to actions of human participants in said event with the marked times.

21. A method of event debriefing according to claim 19, wherein said step of associating a category includes associating a category related to technical parameters of said event.

22. A method of debriefing an aircraft flight simulator exercise, comprising:

simulating aircraft flight;

recording a plurality of datastreams related to a simulated aircraft flight, each datastream including chronological information related to at least one aspect of the simulated aircraft flight;

marking times during the simulated aircraft flight and for associating a category with the marked times; and retrieving information from said datastreams based upon the marked times in a selected category, and for presenting the retrieved information from the datastream for the marked times in the selected category.

23. A method of debriefing an aircraft flight simulator exercise according to claim 22, wherein said step of retrieving information from said datastreams based upon the marked time comprises retrieving information from said datastreams beginning at the marked time and continuing chronologically thereafter, and presenting the retrieved information from the datastreams in time synchronism.

24. A method of debriefing an aircraft flight simulator exercise according to claim 22, wherein said step of recording a plurality of datastreams related to an event comprises:

producing a video datastream of actions of flight simulator exercise participants;

producing an audio datastream of audible communications of flight simulator exercise participants; and producing an instrumentation datastream from various flight simulator flight exercise monitoring instruments.

25. A method of debriefing an aircraft flight simulator exercise according to claim 24 wherein said step of retrieving and presenting the retrieved information comprises displaying said video and instrumentation datastreams in a respective one of a plurality of display zones in time synchronism.

26. A method of debriefing an aircraft flight simulator exercise according to claim 25, further comprising the step of performing said audio datastream with said displayed video and instrumentation datastreams in time synchronism.

27. A method of debriefing an aircraft flight simulator exercise according to claim 22, wherein said step of marking a time during the extended time period further comprises:

associating a category with the marked times; and retrieving information from said datastreams based upon the marked times in a selected category, and presenting the retrieved information from the datastream for the marked times in the selected category.

28. A method of debriefing an aircraft flight simulator exercise according to claim 27, wherein said step of associating a category includes associating a category related to actions of human participants in said flight simulator exercise with the marked times.

29. A method of debriefing an aircraft flight simulator exercise according to claim 27, wherein said step of associating a category includes associating a category related to technical parameters of said flight simulator exercise.

30. A method of debriefing an aircraft flight simulator exercise according to claim 22 further comprising:

marking a time during the extended time period wherein at least one of said aspects meets predetermined criteria; and retrieving information from said datastreams based upon the automatically marked time, and for presenting the retrieved information from the datastreams.

* * * * *

UNITED STATES PATENT AND TRADEMARK OFFICE
CERTIFICATE OF CORRECTION

PATENT NO. : 5,826,206
DATED : October 20, 1998
INVENTOR(S) : Nemeth

It is certified that error appears in the above-identified patent and that said Letters Patent is hereby corrected as shown below:

On the title page, item [56]:
In the References Cited, U.S. PATENT DOCUMENTS, line 16, "5,366,676" should read --5,366,376--.

Column 16, line 40, "claim 4" should read --claim 5--; line 45, "claim 5" should read --claim 6--.

Column 17, line 61, "claim 4" should read --claim 19--.

Signed and Sealed this

Third Day of August, 1999

Attest:

Q. TODD DICKINSON

*Attesting Officer*        *Acting Commissioner of Patents and Trademarks*